United States Patent [19]

Blancato

[11] Patent Number: 4,731,743

[45] Date of Patent: Mar. 15, 1988

[54] METHOD AND APPARATUS FOR DISPLAYING HAIRSTYLES

[75] Inventor: Vito Blancato, Coral Springs, Fla.

[73] Assignee: Combputer Images, Inc., Coral Springs, Fla.

[21] Appl. No.: 796,981

[22] Filed: Nov. 12, 1985

[51] Int. Cl.⁴ .................... G06F 15/66; H04N 7/18; G09B 19/10

[52] U.S. Cl. .................... 364/521; 358/93; 358/903; 434/94

[58] Field of Search ............... 358/93, 183, 102, 180, 358/181, 182, 185, 903, 22; 434/94; 364/518, 521

[56] References Cited

U.S. PATENT DOCUMENTS 4,297,724 10/1981 Masuda et al. .................... 358/93
4,539,585  9/1985 Spackova et al. .................. 358/93

OTHER PUBLICATIONS

"MacVision Owner's Manual" by Koala Technologies Corporation, 1984.
"MacPaint Manual" by Apple Computer, Inc., 1983.

*Primary Examiner*—Felix D. Gruber
*Assistant Examiner*—David Goldman
*Attorney, Agent, or Firm*—Blum Kaplan

[57] ABSTRACT

An apparatus and method for previewing a subject on a computer screen. Prior to such preview, a plurality of new hairstyles is stored in a disk associated with the computer. The subject's face is outlined and the subject's hair is removed and replaced with one of the new hairstyles stored in the computer's databank. Various modifications can be made to the image of the subject with the new hairstyle to complete the picture. A graphic printer provides a hardcopy of the subject with the new hairstyle.

32 Claims, 5 Drawing Figures 4,731,743

METHOD AND APPARATUS FOR DISPLAYING HAIRSTYLES

BACKGROUND OF THE INVENTION

This invention relates to a method and apparatus of creating a new hairstyle on a subject and more particularly to such a method and apparatus utilizing a digital computer and television camera in combination in which the video image of the subject is transferred to the computer, the present hairstyle is electronically removed from the computer image and a new hairstyle is placed on the remaining image.

For many years people have wondered what they would look like in a different hairstyle. The only way to find out the answer to that question has been to go to a beautician or barber and have your hairstyle changed. In many instances, it is impossible to return to the original style if the person does not like the new style. For example, a woman with long hair who wonders what she would look like with short hair would be unable to return to a long hairstyle once the hair is cut.

Even when a customer underwent a new style change, that person would still wonder what they would have looked like with a different style. In addition, when the customer receives the new hairstyle, their spouse, friends or other loved ones may not be entirely satisfied with the new look. Further, the spouse and others may have desired a different hairstyle rather than the hairstyle selected by the customer.

Whenever the customer walks into a barber shop or a beauty shop, the professional barber or beautician may know of new or current styles which would be very attractive on the customer. However it is difficult for the professional hairstylist to convince a customer to undergo a change unless a customer can actually see himself or herself with the new hairstyle. Merely showing the customer a picture of a professional model with the latest hairstyle may create some interest in the customer for undergoing a hairstyle change, but it still may be difficult and time consuming for the hairstylist to convince the customer to undergo the hairstyle change. The reason, of course, is that the customer is very cautious in undergoing a hair style change since he or she cannot actually visualize himself or herself with the new hairstyle.

The advent of modern electronics has provided the small retail barber shop or beauty shop with the economic ability to afford a personal computer. Recent innovations have permitted television pictures to be converted for viewing on a video display and to be modified, or operated upon, in a certain desired manner. For example, the Macintosh computer, a trademark of Macintosh Laboratory, Inc. and which is licensed to Apple Computer, Inc. of Cupertino, Calif., when attached to a MacVision digitizer unit, a trademark of and manufactured by Koala Technologies Corporation of Santa Clara, Calif., produces signals representative of an image taken by a television camera which can be viewed on a video display and thereafter operated upon.

It is therefore desirable to provide a method and apparatus which uses a computer system to enable a person to see himself or herself with one or more new hairstyles.

SUMMARY OF THE INVENTION

In accordance with one aspect of this invention, a method of using a video camera with a computer system to create a hairstyle change on a subject, where the computer includes a video display and data storage means, includes the steps of storing in the storage means data manifesting a proportioned, selectable plurality of hairstyles and displaying a correspondingly proportioned present image of the subject on the video display. In addition, the method includes the steps of separating on the display the face and hairstyle of the present image, removing the separated hairstyle from the present image to create a remaining image of only the face and joining the remaining image and a selected hairstyle obtained from the storage means to create the hairstyle change on the subject. The method also includes displaying the face of the subject at a predetermined angle on and having the face cover a predetermined area of the video display. Preferably an overlap is placed on the display for defining the predetermined angle and predetermined area.

Accordingly, it is an object of this invention to provide a method and apparatus which previews the appearance of a subject with a new hairstyle.

It is another object of the invention to provide a method and apparatus which employs a computer system and video camera to preview an image of a subject with a desired new hairstyle.

It is another object of the invention to provide a method and apparatus which provides a permanent copy of the previewed subject with the desired new hairstyle.

Still other objects and advantages of the invention will in part be obvious and will in part be apparent from the specification.

The invention accordingly comprises several steps and the relation of one or more of such steps with respect to each of the others, and the device embodying features of construction, combination of elements and arrangements of parts which are adapted to effect such steps, all is exemplified in the following detailed disclosure and the scope of the invention will be indicated in the claims.

BRIEF DESCRIPTION OF THE DRAWINGS

For a further understanding of the invention, reference is made to the following description taken in conjunction with the accompanying drawings, in which.

DETAILED DESCRIPTION OF THE PREFERRED EMBODIMENT

Figure 1:
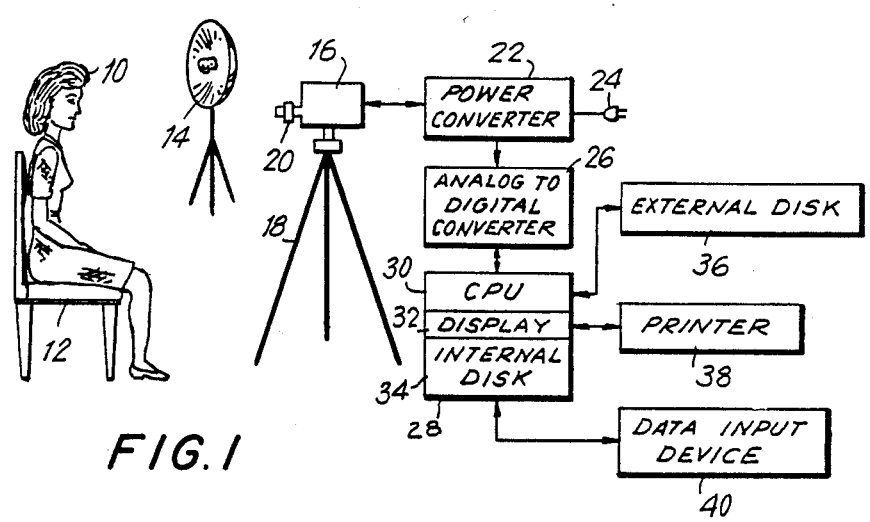
FIG. 1 is a block diagram of the apparatus used in the subject invention.

Referring now to FIG. 1, a block diagram of the hardware used in performing the invention is shown. A subject 10 is seated in a chair 12 and illuminated by appropriate lights 14. An image of subject 10 is obtained by television camera 16, which is positioned in a stationary manner on a camera stand 18. Camera 16 includes a zoom lens control 20 for increasing or decreasing the size of the picture obtained. Initially, zoom lens control 20 should be set to obtain the entire face and hair of subject 10.

Camera 16 receives its power from a power converter 22 which has a plug 24 adapted to being plugged into conventional household current. Alternatively, camera 16 may be powered by conventional batteries used to power portable cameras. An electric signal manifesting the conventional video image is provided from camera 16 to an analog to digital converter 26 through power converter 22. A suitable analog to digital converter is the MacVision digitizer unit device, a trademark of an manufactured by Koala Technologies Corporation of Santa Clara, Calif.

A computer system 28 is attached to converter 26 to both receive the converted digital signal therefrom and to control converter 26 regarding the manner in which the signal is transmitted to computer system 28. Computer system 28 includes a central processing unit (CPU) 30, an internal graphics display 32 and an internal disk drive 34. An example of such a computer system 38 is the Macintosh computer, a trademark of Macintosh Laboratory, Inc. and which s licensed to and manufactured and sold by Apple Computer, Inc. of Cupertino, Calif.

Attached to computer system 28 is a second external disk drive 36 which may be used for storing data used in the method of the subject invention. This is contrasted with the internal disk 34 which may be used to store the operating programs used to control the method of the subject invention. In addition, a graphic printer 38 is attached to computer system 28 and one or more appropriate data input devices 40 are attached to system 28. The data input devices 40 may include a keyboard and a device known as a mouse. As is well known, a mouse is a device which can be rolled on a flat surface to cause a corresponding movement of the cursor of computer system 28, as viewed on display 32.

In controlling computer system 28 and its associated apparatus, two principal programs are required. The first program is the MacPaint computer program, a trademark of and is copied onto the MacPaint program so that the user may install a single operating program diskette in internal disk drive 34 to control all aspects of the subject method. A data diskette containing digital data which manifests a plurality of selectable hairstyles is stored on a disk which can be inserted into external disk 36. The computer system 28 can then read the data for a selected hairstyle from external disk 36 and allow it to be manipulated in a manner to be described hereafter. Also described hereafter is the manner in which the data is placed on the data diskette.

Figure 2:
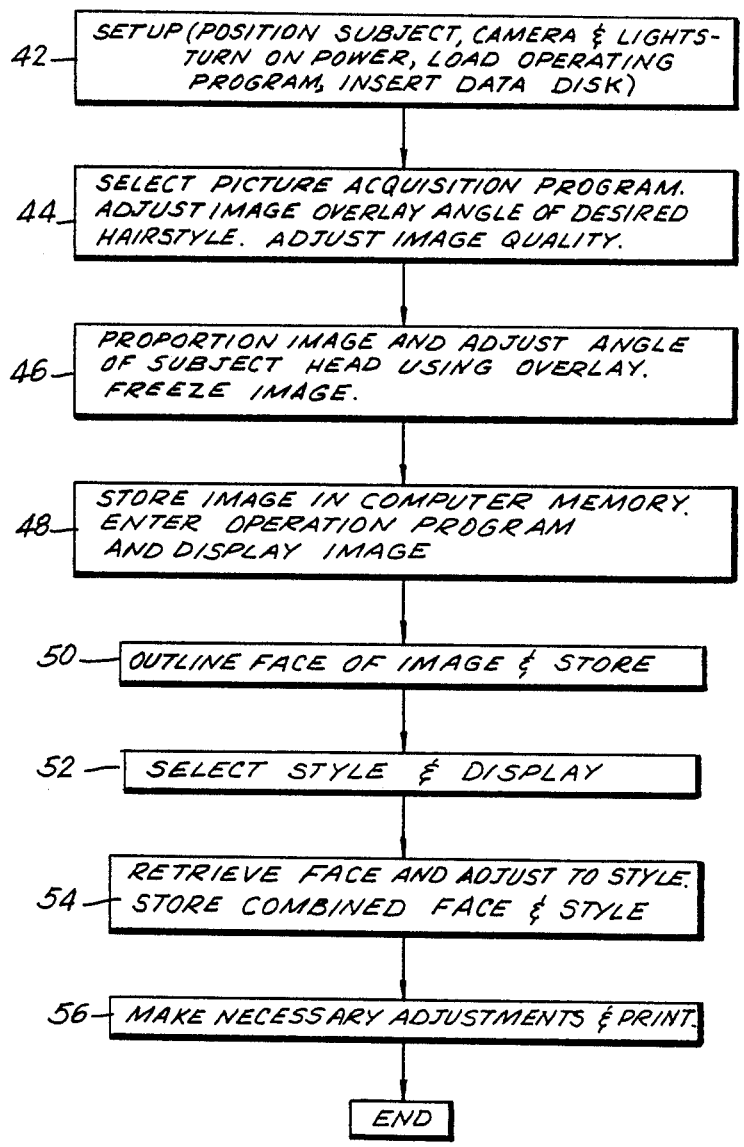
FIG. 2 shows a general flow diagram of the procedures used in the method of the subject invention.
Figure 3:
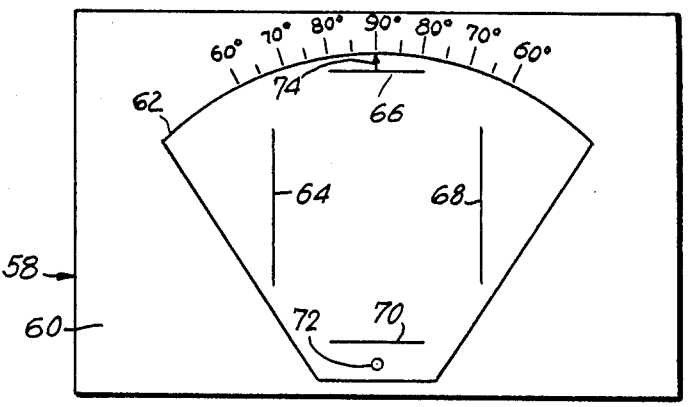
FIG. 3 shows the overlap used to proportion the images.

Referring now to FIG. 2, a flow diagram of the method of the subject invention is shown. Before describing the method in detail, however, a general description of what happens during the operation of the method will be given. The purpose of the invention, of course, is to show a customer, such as subject 10, what that customer would look like with a different hairstyle. To accomplish this, a video image of the face of subject 10 is caused to be displayed on display 32. This image is adjusted in size by using an overlay device, such as shown in FIG. 3, and by controlling zoom lens control 20. The data stored on the data diskette in external disk 36 will also have been proportioned to the same size. Thereafter, by using certain functions of the MacPaint program, the hair can be removed leaving only the outline of the face from subject 10 appearing on display 32. Then the selected new hairstyle is retrieved from the data diskette in external disk 36 and the cutaway face and new hairstyle are pasted together. Any additional operations which must be performed are then done, such as filling in blank areas or eliminating unwanted lines and the resultant image is printed on printer 38.

The detailed operation of computer system 28 will hereafter be described with respect to blocks 42 through 56 (even numbers only) shown in FIG. 2. First, according to block 42, the initial set up procedure occurs. By this it is meant that subject 10 must be properly positioned with respect to camera 20 and lights 14 turned on and adjusted. The operating program is inserted into the internal disk 34 of computer 28 and the data disk is inserted into external disk 36.

Next, according to block 44, after subject 10 is properly positioned with respect to camera 16, the MacVision program is selected from the menu of programs on the operating program diskette to cause the picture acquisition to occur. This results in a video image of subject 10 being scanned across display 32. During the scanning of the image of subject 10 on display 32, the image quality is adjusted by adjusting knobs on converter 26. These knobs are used to adjust both the contrast of the picture as well as the brightness of the picture.

Next, according to block 46 and after the camera and subject are properly positioned together with the appropriate lighting and the proper contrast and brightness are set, a useable picture must be obtained for subsequent use in changing the hairstyle. This requires a proportioned image to be obtained of the subject's head using the overlay 58 shown in FIG. 3 and adjusting the zoom control 20.

Referring now to FIG. 3, the overlay 58 referred with respect to block 46 is shown. Overlay 58 includes a backing sheet 60 and a rotating sheet 62. Both backing sheet 60 and rotating sheet 62 should be made of a clear plastic material, such as acetate, and be capable of having printed thereon certain data to be described hereafter. The data on rotating sheet 62 includes a left frame line 64, top frame line 66, right frame line 68, and bottom frame line 70 which define the proper proportioning of the face of the image of subject 10. Rotating sheet 62 is designed to rotate about a pivot 72 with respect to backing sheet 60 and an arrow 74 extending upward from the center of top frame line 66 is also printed on rotating sheet 62. Printed on backing sheet 60 is a plurality of angular designations from 60 degrees to 90 degrees to the left and right of a perpendicular at 90 degrees. The arrow 74 is positioned at the 90 degree designation when the lines 64 and 68 are vertical with respect to the sides of backing sheet 60.

Prior to having begun the procedure, subject 10 would have looked through a catalog of pictures of various hairstyles and selected the picture having the hairstyle subject 10 believed desired. Data manifesting this picture would have previously been stored in an addressable location on the data diskette inserted into external disk 36. It should be noted however that in many of the photographs in the catalog from which subject 10 selects one or more new hairstyles, the head of each model with a new hairstyle may be at a slight angle on the photograph. This angular position of the head of the model would cause the data manifesting the new hairstyle on the model stored on the diskette in external disk 36 to also be at an angle. Thus, one would desire that the head of subject 10 correspondingly be positioned at the same angle so that when the new hairstyle is removed from the disk in external diskette 36 and placed on the face of subject 10 appearing on display 32, there is no angular mismatch between the new hairstyle and the face.

Figure 4:
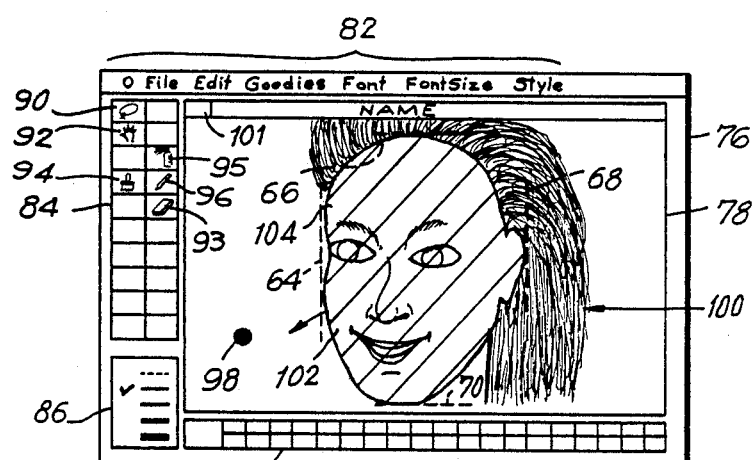
FIG. 4 shows the proportioned image of the subject on the computer display.

In order to avoid the above noted angular displacement problem overlay 58 is placed on the picture selected by subject 10 and rotating sheet 62 is rotated to a position equal to a vertical line through the center of the head of the model having the new hairstyle. Thereafter, overlay 58 is placed directly against the screen of display 32. Two things are then required before the final image of subject 10 is obtained. First, zoom lens 20 must be adjusted in order to have the entire face of subject 10 positioned between the lines 64, 66, 68 and 70. This is shown in FIG. 4 with the lines 64, 66, 68 and 70 shown as dashed lines. In addition, if it had been necessary to rotate rotating sheet 62 with respect to backing sheet 60, the head of subject 10 is titled as necessary to ensure that the head is aligned with now rotated lines 64, 66, 68 and 70. In FIG. 4 it is assumed that arrow 74 is pointing towards 90 degrees and that no rotation of subject's head is required. It should be noted that in controlling zoom lens control 20 on camera 16 only the face of subject 10 should be positioned between the lines 64, 66, 68 and 70. It is not desired that the entire picture, including the hair of subject 10, be positioned between the lines.

Referring again to FIG. 2, once the image has been properly proportioned and the subject's head adjusted at the appropriate angle, the resultant image is then frozen. In using the MacVision program this may be accomplished by merely clicking the mouse button on the mouse portion of data input devices 40. Once the image is frozen, subject 10 may relax and the power to camera 16 and light 14 may be disconnected.

Next, according to block 48, the frozen image is stored in the memory of the computer system 28. Then the MacVision program, used to obtain the image, is exited and the MacPaint program is entered and the image is displayed again with respect to the MacPaint program. Such a display would be similar to that shown in FIG. 4 with the lines 64, 66, 68 and 70 removed. As is well known, the MacPaint program includes a plurality of icons which can be used to easily manipulate the picture shown in the picture frame 78 of display screen 76. The icons include the commands 82, the tools 84, the line widths 86 and the patterns 88. Of importance for the subject method are the tools called a lasso 90, a hand 92, a paint brush 94, an eraser 93, a spray paint 95 and a pencil 96. The mouse portion of data input device 40 can be moved to cause a cursor 98 to be moved over one of the commands 82, tools 84, line widths 86 or patterns 88 in order to select the appropriate icon desired. For example, if the hand icon 92 is selected, cursor 98 takes the shape of a hand. Then by touching an image 100 appearing on picture frame 78, the image 100 can be moved up, down, right or left as indicated by movement of the mouse. Further, if it were desired to do an editing function, the mouse would move cursor 98 over the word edit in commands 82 and the button on the mouse would be released. This would cause a menu of edit functions to appear and the mouse again would move the cursor to illuminate a select one of the edit functions. For further information on utilizing the Macintosh computer, reference is made to the documents provided therewith by Apple Computer, Inc.

Referring now to block 50 in FIG. 2, the next step is to outline the face of image 100 and to store that face. This may occur by selecting the lasso icon 90 and moving the mouse so that the lasso traces an entire face 102 of image 100. This trace is shown by a dark line 104 in FIG. 4. After the entire face 102 is outlined by the lasso icon 92, as indicated by line 104 in FIG. 4, the edit menu is selected and the copy function therefrom is selected. This causes the area within line 104 to begin blinking as manifested in FIG. 4 by the slanted lines within line 104. After arrow camor is clicked in a box 101 located in the upper left hand corner of frame 78, the screen goes blank and the file command is selected. Within that command, the open function is selected to cause the blinking image within line 104 to be stored in the memory of computer system 28. While in the file menu, the drive function is then selected to enable data to be obtained from external drive 36. When this occurs, a menu appears with the various hairstyles stored on the diskette within external drive 36 and the desired hairstyle is selected using the mouse. This is indicated by block 52 in FIG. 4 and the result is that the hairstyle 106 is then displayed on the picture frame 78 portion of display as shown in FIG. 5.

Figure 5:
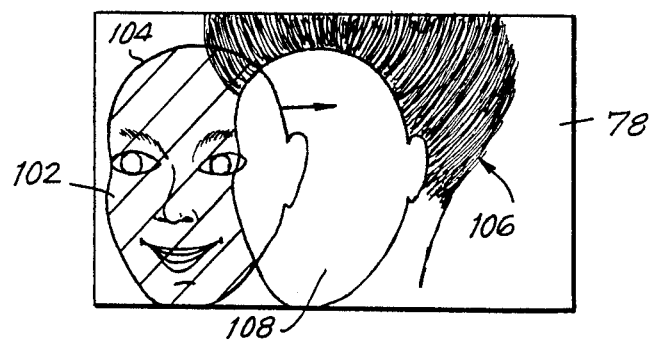
FIG. 5 shows the face of the subject being inserted into a new hairstyle.

Referring now to block 54, in FIG. 2, the face 102 previously stored at block 50 is retrieved and, as shown in FIG. 5, is moved towards a displayed new hairstyle 106 and into a blank face position 108 thereof. This may be accomplished by utilizing the hand icon 92 to move the face 102 with respect to the displayed new hairstyle 106. Once the face 102 is positioned properly with respect to the new selected style 106, then according to block 56 of FIG. 2 further adjustments, as necessary, are made and the resultant image is printed on printer 38.

Many adjustments can be made once face 102 is properly positioned with respect to selected style 106. For example, the face cut away from image 100 shown in FIG. 4 of subject 10 may not exactly fit in the blank face 108 of the position style 106. Thus, it may be necessary to remove or fill in certain areas around the face 102 with respect to the selected style 106. If the sides of the hairstyle and face of the customer do not match, the lasso icon 90 can be used to move the hairstyle and bring the two into alignment. Further, the hairstyle on selected style 106 may be too high or too wide for the particular person having face 102 and by using the lasso 90 icon, a certain portion of the hair may be cut away and moved downward to give it a smaller look. Some smoothing may be accomplished by using the paintbrush icon 94 or pencil icon 96. Also, if the image on display 76 requires additional hair, such as additional length or hair behind the ears, the spray paint icon 95 can be used. If hair is to be removed, the eraser icon 93 may be used. In addition, the bangs can be adjusted or rotated using a Click-Art Effect computer program sold by T/Maker Graphics of Mountainview, Calif.

In addition, the adjustments may include a series of special substyles stored in the scrap book menu in the MacPaint program. For example, a series of bangs, mustaches and beards may be stored and the operator of computer system 28 may desire to place a different type of bang or mustache or beard on the image being formed. The computer program may include a help menu in the notepad and included as a part of the MacPaint program.

After the necessary adjustments are made to the final image, the print function is selected from file command and the image on picture frame 78 is printed by a graphic printer 38. At that point the subject 10 can be handled a printed copy of the new hairstyle on the subject's face.

The data stored on the data disk may be obtained in substantially the same way as outlined above. However, instead of taking a video picture of a subject 10, the video picture would be of the photograph showing the style. The zoom control 20 would be adjusted so that the image of the photograph would fit within the lines 64, 66, 68 and 70 of overlay 58. In so doing, the rotating sheet 62 of overlay 58 can be adjusted so that the vertical lines 64 and 68 are aligned with the general direction of the photograph.

Once the photograph is properly positioned and aligned on display 32, the face of the model is removed using the lasso icon 90 resulting in the hairline of the model bordering lines 64, 66, 68 and 70 of overlay 58. Thereafter, the remaining hair is stored on the external disk 36 diskette in an addressable position thereof. The definition of that position should be marked on the photograph so that the style can be retrieved simply.

If after printing of a particular image of subject 10 with a new hairstyle, it is desired that a second style be placed on subject's head, the same procedure can be repeated. Where the angular adjustment for both styles is the same, it may not be necessary to obtain the facial image of subject 10 once again.

As now can be readily appreciated, the invention provides a method and apparatus for quickly and simply previewing one or a plurality of new hairstyles on a subject. Permanent copies of the subject's appearance with the new hairstyle are also readily available through this invention.

It will thus be seen that the objects set forth above, and those made apparent from the preceding description, are efficiently obtained and, since certain changes may be made in the above construction without departing from the spirit and scope of the invention, it is intended that all matter contained in the above description or shown in the accompanying drawings shall be interpreted as illustrative and not in a limiting sense. It is also to be understood that the following claims are intended to cover all the generic and specific features of the invention herein described, and all statements of the scope of the invention, which, as a matter of language, might be said to fall therebetween.

What is claimed is:

1. A method of using a video camera with a computer system to create a hairstyle change on a subject, said computer system having a video display and data storage means, said method comprising the steps of:
    storing in said storage means data manifesting a proportioned selectable plurality of hairstyles;
    displaying a correspondingly proportioned present image of said subject on a video display;
    separating on the display the face and hairstyle of said present image;
    removing the separated hairstyle from said present image to create a remaining image of only the face; and
    joining the remaining image and a selected hairstyle obtained from said storage means to create the hairstyle change on the subject.

2. The method according to claim 1 wherein said method further includes the step of adjusting the relative position between said selected hairstyle and said remaining image.

3. The method according to claim 2, wherein said face is proportioned by adjusting the size of the face to fit within an area defined by an overlay.

4. The method according to claim 3, further including placing said overlay over said video display, providing marks on said overlay defining said area and adjusting the lens of said video camera for fitting the face within said area.

5. The method according to claim 4, further including adjusting said overlay to conform to the angle of the selected hairstyle; and wherein said step of displaying includes adjusting the angular position of the face of the subject to a position for fitting the face within the overlay marks.

6. The method according to claim 5, wherein said step of storing said data manifesting said plurality of hairstyles includes proportioning an image of each of the plurality of hairstyles on the video display in accordance with the area defined by said overlay.

7. The method according to claim 6, wherein said step of proportioning said image of each of the plurality of hairstyles from which said stored data is obtained includes the step of adjusting the lens of said video camera.

8. The method according to claim 7, wherein said step of separating includes the step of tracing the face of the present image.

9. The method according to claim 8, wherein said step of removing includes the steps of storing in said storage means and reading from said storage means said data manifesting said remaining image.

10. The method according to claim 9, further comprising the steps of modifying the joined remaining image and selected hairstyle.

11. The method according to claim 10, wherein said step of modifying includes changing the size of said selected hairstyle.

12. The method according to claim 10, wherein said step of modifying includes filling an area between said remaining image and said selected hairstyle.

13. The method according to claim 10, wherein said step of modifying includes operating upon the forehead area of said remaining image to affect bangs associated with said selected hairstyle.

14. The method according to claim 3, wherein said step of storing said data manifesting said plurality of hairstyles includes the step of proportioning an image of each of the plurality of hairstyles on the video display in accordance with the area defined by said overlay.

15. The method according to claim 14, wherein said step of proportioning said image of each of the plurality of hairstyles from which said stored data is obtained includes the step of adjusting the lens of said video camera.

16. The method according to claim 1, wherein said step of separating includes the step of tracing the face of the present image.

17. The method according to claim 1, wherein said step of removing includes the steps of storing in said storage means and reading from said storage means said data manifesting said remaining image.

18. The method according to claim 1, further comprising the step of modifying the joined remaining image and selected hairstyle.

19. A method of displaying a new hairstyle on a subject comprising:
    displaying on a screen at least the face and present hairstyle of the subject;

separating on the screen the face from the present hairstyle;

removing the present hairstyle from the screen;

displaying on the screen a selected one of a plurality of new hairstyles; and joining the face and selected new hairstyle together on the screen.

20. The method of claim 19, further including positioning the face to cover a predetermined area of the screen.

21. The method of claim 20, further including positioning the face at a predetermined angle on the screen.

22. The method of claim 21, further including placing an overlay which defines the predetermined area and predetermined angle over the display.

23. The method of claim 20, further including storing the plurality of new hairstyles in memory means.

24. The method of claim 23, further including proportioning the hairline of each of the plurality of hairstyles such that each hairline conforms to the border of the predetermined area.

25. The method of claim 24, wherein said proportioning of each of the plurality of hairstyles occurs prior to storage thereof.

26. The method of claim 19, wherein the step of removing includes storing only the face in memory means.

27. The method of claim 26, further comprising recalling the face from memory means.

28. The method of claim 19, further including obtaining an image of said subject through operation of a camera.

29. A method of displaying a new hairstyle on a subject comprising:

obtaining an image of at least the face and present hairstyle of said subject through operation of a camera;

displaying on a screen said image;

proportioning the face of said image to fit within a predetermined area and at a predetermined angle on the screen;

separating on the screen the face from the present hairstyle;

storing only the face in memory means;

displaying on the screen one of a plurality of new hairstyles stored in the memory means, each of said hairstyles having a hairline conforming to the border of the predetermined area;

recalling the face from the memory means; and joining the face and selected new hairstyle on the screen.

30. An apparatus for displaying a new hairstyle on a subject comprising:

storage means operable for storing data manifesting a plurality of new hairstyles;

display means adapted to display an image of at least the face and present hairstyle of the subject;

overlay means for orienting and sizing the face on the display means;

means for separating on the display means the face and present hairstyles;

means for removing from the display means the present hairstyle from the face; and means for joining the face and one of the plurality of new hairstyles on the display means.

31. The apparatus of claim 30, further comprising a video camera for obtaining the image of the subject.

32. The apparatus of claim 31, wherein a central processing unit of a computer serves as the means for separating, the means for removing and the means for joining.

* * * * *